UNITED STATES PATENT OFFICE.

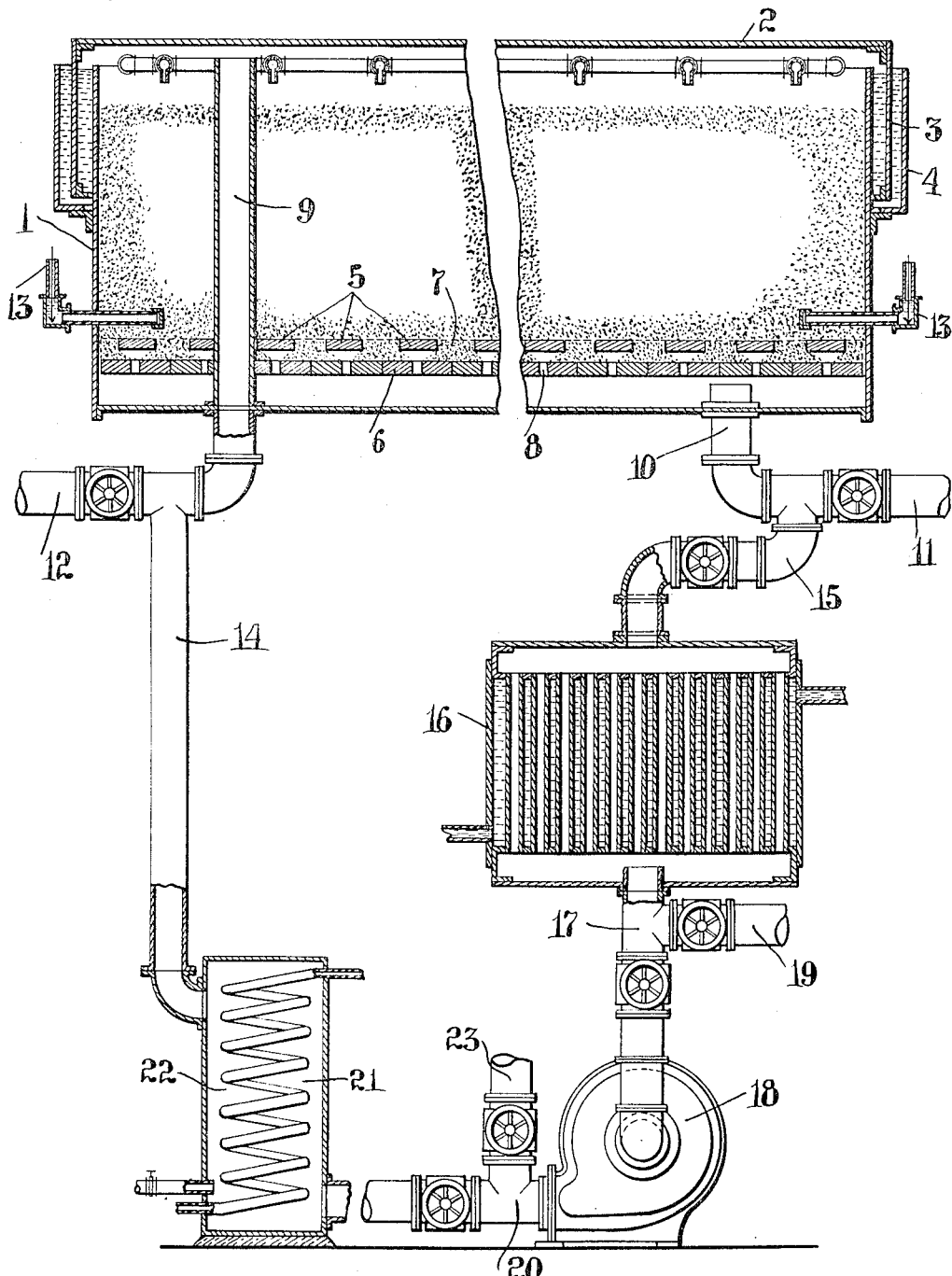

HENRY L. DOHERTY, OF NEW YORK, N. Y.

PROCESS OF PRODUCING OXIDS.

No. 927,644.  Specification of Letters Patent.  Patented July 13, 1909.

Application filed October 14, 1908. Serial No. 457,721.

*To all whom it may concern:*

Be it known that I, HENRY L. DOHERTY, a citizen of the United States, residing at New York, in the county of New York and State of New York, have invented a certain new and useful Process of Producing Oxids; and I do hereby declare the following to be a full, clear, and exact description of the same, such as will enable others skilled in the art to which it appertains to make and use the same.

This invention relates to processes of producing oxids and consists in a method of oxidizing metals to form hydrates and oxids by means of air under controlled conditions of temperature and moisture, said oxidation being controlled by greater or less dilution of the air; all as more fully hereinafter set forth and as claimed.

It is desirable in many arts to produce oxids and hydrated oxids of metals in the form in which they appear by low temperature oxidation. Hydrated oxids of iron produced at low temperatures are almost molecular in their fineness of grain and may be readily ground to impalpable powder for use in pigments and like purposes. Such oxids furthermore have distinctive tints. They are also highly reactive and well suited for chemical purposes, such as the purification of gas, clarification of water and the like. These oxids on exposure to higher temperatures lose more or less of their water, assuming other tints, and become much less reactive, assuming the "aged" condition. In this aged condition the ultimate molecules apparently unite more or less to form polymerids or condensed products, and a mass of the oxid as a whole is less fine-grained.

In the present invention hydrated oxids of iron are produced by regulated oxidation of metallic iron by more or less diluted air, that is air diluted to contain a less than normal amount of oxygen under controlled temperature conditions and in the presence of moisture. From the product so obtained, other hydrates and oxid of iron may be obtained by careful heating to produce products of different tints.

Iron in the form of chips, shavings, filings and the like constituted forms does not readily and quickly oxidize by simple exposure to the atmosphere, even when moist; this being in part due to the dissipation of the heat of oxidation by the atmosphere and in part due to the fact that no good circulation of air through the mass of comminuted iron is possible. When such a mass is confined in containers in a moist state and air forced through it, on the other hand, the temperature is apt to rise to such an extent that products are formed which are irregularly oxidized and wholly or partially dehydrated. Under such circumstances, oxidation is very apt to be too rapid and irregular.

It is the purpose of the present invention to provide a simple, cheap and ready method of producing uniformly oxidized and hydrated, low-temperature oxidation products of iron in a condition in which such products will be eminently reactive, or will be "un-aged" and will be very fine-grained, being suitable for gas or water purification or for pigments. In this invention, the comminuted iron in the form of chips, shavings, filings, borings or the like is placed in a suitable container, the mass being made porous if necessary by admixture of shavings or the like, moistened and a current of air driven through. As the temperature begins to rise by oxidation of the iron, the pure air is replaced by air more or less diluted by indifferent gases, the dilution being proportional to the observed tendency of the temperature to rise above a certain predetermined point, and, to facilitate keeping this fixed point, such air being cooler or warmed somewhat, as circumstance may dictate. Very conveniently, the iron is contained in a closed vessel having a closed air circuit comprising a fan or other forcing mechanism, a heater and a cooler. By further providing such air circuit with an inlet on the suction side of the fan and an outlet on the pressure side, the per cent. of oxygen in the air circulating in the closed circuit may be readily adjusted. By continuous passage, the oxygen will be quickly absorbed, a single passage being often sufficient, leaving nothing but the residual nitrogen to circulate. By opening the outlet on the pressure side of the fan, a small amount of the nitrogen may be allowed to escape and by opening the inlet on the suction side a corresponding amount of air may be allowed to enter. The entering air is of course diluted to any desired extent by the circulating nitrogen.

While other indifferent gases, such as washed and purified products of combustion, lighting gas and the like may be employed as diluting agents in lieu of nitrogen so produced, such nitrogen resulting from absorption of the oxygen of air is convenient and permits a relatively simple operation in closed circuit. Steam is not an advantageous diluent for most purposes, unless working under diminished pressure, since its temperature is generally higher than is desired in the reaction chamber. Some steam may, however, be used. The reaction chamber may be kept under any desired plus or minus pressure.

In the accompanying illustration is shown, more or less diagrammatically, one of the many types of apparatus suitable for use in the described process. In this showing;

1. designates the reaction chamber as a whole. To permit convenient charging and discharging, the chamber is provided with a removable top, 2, having flanges 3, dipping into sealing devices 4. Any other type of top may be employed. To permit good, uniform and thorough circulation of the diluted air through the mass of metal to be oxidized, the chamber is preferably provided with the special pair of false bottoms, 5 and 6, shown. These bottoms are respectively provided with the series of orifices, shown; the orifices 7 of the upper bottom being arranged in staggered relationship to the orifices 8 of the lower bottom and being larger. By suitably adjusting the relative sizes of the orifices in the two bottoms and the distances apart of such bottoms, granular material tumbling through the upper orifices will assume the form of angle-of-repose hillocks on the lower bottom without reaching the lower orifices and gas or air entering through such lower orifices can easily pass through the hillocks and upper orifices. By this means, a very uniform distribution of such gas or air through the mass to be treated may be secured. The reaction chamber as shown is further provided with an air inlet pipe 9 communicating with its top and an air exit pipe 10 communicating with the space below the lower false bottom. These pipes are further provided with valved continuations 11 and 12 whereby any desired mixture of air and gases may be introduced and removed. Thermometers 13 provide for observation of the temperature within the reaction chamber.

When it is desired to work with a gas mass circulating in closed circuit, instead of using connections 11 and 12, connections 14 and 15 may be used. Pipe 15 connects with pipe 10 and a cooling device 16. Beyond the cooler is a pipe connection 17, connected with the suction side of fan 18 and carrying a valved air inlet 19. On the pressure side of the fan is a pipe connection 20, leading to a heater 21, containing steam pipe 22. Connection 14 carries air back to the reaction chamber through 9. Pipe 20 is provided with a valved outlet 23.

From the foregoing, the operation of this apparatus is readily seen. The reaction chamber is filled with comminuted metal, which may be admixed with shavings or the like necessary for porosity of the mass. The mass is wet, preferably with a saline solution, such as salt solution, to hasten reaction, and a current of air passed through it by means of the fan, the air inlets and outlets on the pipe system being partly open so that, at this stage of the operation, the mass may be treated with substantially pure air. At this stage of the operation, the air is best warmed somewhat by the steam pipe. As the oxygen is absorbed, the mass begins to warm up, as will be clearly evident by the thermometric readings, and the inlets and outlets for air are partly closed to insure a greater or less dilution of the air entering through the former. The dilution and the temperature adjustment by the heater and cooler shown are so managed as to keep a tolerably uniform temperature prevailing in the reaction chamber. For most purposes, in working with iron, it is best to keep the temperature at some point between 80° F. and 120° F., as between those temperatures an exceptionally reactive ferric hydrate can be obtained. As the oxidation proceeds and the free iron disappears, the temperature tends to fall again and the dilution of the air should be again diminished, finishing finally, usually, with pure air, the temperature of the gas mass being controlled by the heater and cooler.

The hydrated oxid formed between the stated ranges of temperature is very reactive and forms an advantageous material for the preparation of ferric salts with weak acids, such as citric, tartaric, acetic, lactic and the like, as it dissolves readily, enabling the production of salts suitable in medicine, dyeing, water purifying and the like. The oxid is also suitable as such for gas purification— for which purpose it may be left in the original reaction chamber, the gas to be treated being sent through the chamber by appropriate valved connections in lieu of the diluted air used for forming such oxid. Or it may be used for clarifying water or other liquids, being light, voluminous, reactive and readily flocculating suspended particles in such liquids.

Where shavings or such light organic materials have been used for giving porosity to the mass, after oxidation the mass may be simply treated with water and the shavings floated off, leaving the oxid behind.

The hydrated oxid so formed may be employed as a pigment, either as formed or after being given different tints by regulated heating and dehydration. If dried, it may be fine-ground before such dehydration to give an impalpable powder. Such impalpable powder if heated to complete dehydration gives a rouge which may be used in polishing and is very advantageous for this purpose, being free of grit or dirt if the original iron was clean.

What I claim is:—

1. The process of producing hydrated oxid of iron which consists in oxidizing moist finely divided iron at low temperatures by a current of air diluted to carry less than the normal amount of oxygen.

2. The process of producing hydrated oxid of iron which consists in oxidizing finely divided iron moistened with a saline solution at low temperatures by means of a current of air diluted to carry less than the normal amount of oxygen.

3. The process of producing hydrated oxid of iron which consists in oxidizing moist finely divided iron at low temperatures by means of a current of air diluted to carry less than the normal amount of oxygen, the dilution being directly proportional to the observed tendency of such iron to rise in temperature.

4. The process of producing hydrated oxid of iron which consists in oxidizing moist finely divided iron by a current of air until the observed temperature begins to rise, replacing the air by a current of air diluted to carry less than the normal amount of oxygen, the dilution being directly as such observed tendency to rise in temperature and finally finishing by a current of air as temperatures begin to sink.

5. The process of producing hydrated oxid of iron which consists in confining a moist body of finely divided iron in a suitable reaction chamber and circulating a gaseous body through such iron in closed circuit, excess gas being removed at one point in said circuit and air admitted at another in such proportions as to produce a diluted air, said dilution of the air by said gaseous mass being directly proportional to the observed tendency of the iron to rise in temperature.

In testimony whereof I affix my signature, in the presence of two witnesses.

HENRY L. DOHERTY.

Witnesses:
C. B. GILBERT,
RUSSELL W. JONES.